(12) United States Patent
Lassota et al.

(10) Patent No.: US 8,464,584 B2
(45) Date of Patent: Jun. 18, 2013

(54) BEVERAGE DISPENSER WITH LEVEL MEASURING APPARATUS AND DISPLAY

(75) Inventors: Zbigniew G. Lassota, Long Grove, IL (US); Andrzej Kaminski, Warsaw (PL); Marek K. Kwiatkowski, Round Lake, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 1060 days.

(21) Appl. No.: 12/250,963

(22) Filed: Oct. 14, 2008

(65) Prior Publication Data
US 2009/0212069 A1 Aug. 27, 2009

Related U.S. Application Data

(60) Provisional application No. 60/999,682, filed on Oct. 19, 2007.

(51) Int. Cl.
*G01F 23/26* (2006.01)
(52) U.S. Cl.
USPC .......................................................... 73/304 R
(58) Field of Classification Search
USPC .................. 73/340 R, 290 R, 304 R; 340/620
See application file for complete search history.

(56) References Cited

U.S. PATENT DOCUMENTS

| | | | | |
|---|---|---|---|---|
| 4,513,617 A | * | 4/1985 | Hayes | 73/313 |
| 4,790,239 A | * | 12/1988 | Hewitt | 99/279 |
| 7,712,364 B2 | * | 5/2010 | Radhakrishnan et al. | 73/304 C |

* cited by examiner

*Primary Examiner* — Daniel Larkin
*Assistant Examiner* — Jamar Ray
(74) *Attorney, Agent, or Firm* — James W. Potthast; Potthast & Associates

(57) ABSTRACT

A beverage dispenser (20) has a double-walled tubular, preferably cylindrical, sensor (22) that is immersed in liquid (23), such as coffee or tea, within an opaque, stainless steel container, or beverage dispenser (25) has a double-walled tubular sensor connected via two conductive paths (24, 26) to two inputs (28, 30), respectively, of a resistance measuring circuit (32) that measures the resistance between the two inputs (28, 30) to produce an electrical, direct current, resistance output signal that varies with changes in the instantaneous resistance between the two inputs (28, 30) The resistance output signal is connected to an input (34) of an electronic controller (40) The electronic controller (40) calculates the depth of the liquid (23) based on the magnitude of the resistance output signal applied to the input (34). The sensed and calculated level is then converted to display control output signals produced on a controller output terminal and connected to electronic display (44) to provide a visual indication of the level or quantity of beverage within the dispenser (20). Alternatively, resistance is measured between the interior of the beverage dispenser (20) and a sensor tube.

15 Claims, 7 Drawing Sheets

US 8,464,584 B2

BEVERAGE DISPENSER WITH LEVEL MEASURING APPARATUS AND DISPLAY

CROSS-REFERENCE TO RELATED APPLICATIONS

This application claims the benefit under 35 U.S.C. 119(e) of provisional patent application number 60/999,682 of the present inventors filed Oct. 19, 2007, and entitled "Beverage dispenser with Level Measuring Apparatus and Display", and claims the benefit under 35 U.S.C. 120 of patent application Ser. No. 10/819,828 of Zbigniew G. Lassota filed Apr. 7, 2004, now U.S. Pat. No. 7,980,422, which, in turn, is a division of and claims the benefit under 35 U.S.C. 120 of application Ser. No. 09/931,687 of Zbigniew Lassota filed Aug. 16, 2001, now U.S. Pat. No. 6,741,180, and is a continuation-in-part of application Ser. No. 10/999,283 of Zbigniew G. Lassota et al., filed Nov. 30, 2004, now U.S. Pat. No. 7,789,373 which, in turn, is a continuation-in-part of and claims the benefit of application Ser. No. 09/931,687, now U.S. Pat. No. 6,741,180, which is hereby incorporated by reference.

BACKGROUND OF THE INVENTION

1. Field of the Invention

This invention generally relates to beverage dispensers and, more specifically to beverage dispensers that have opaque bodies such that the level of the beverage within the dispenser cannot be seen through the body.

2. Discussion of the Prior Art

Commercial beverage dispensers of the type with an insulated body that hold substantial quantities of freshly brewed beverage that is dispensed through manual operation of a faucet or actuation of a plunger are well known. If the details of such dispensers are desired, reference should be made to U.S. Pat. Nos. 6,135,009 issued Oct. 24, 2000; 6,499,628 issued Dec. 31, 2002; 6,637,624 issued Oct. 28, 2003; 6,741,180 issued May 25, 2004; 6,619,507 issued Sep. 3, 2003; 6,702,153 issued Mar. 9, 2004 and 6,820,771 issued Nov. 17, 2004, all of which are hereby incorporated by reference.

Such insulated bodies are opaque such that the quantity of beverage within the container cannot be determined from merely looking at the container, such a in the case of a glass carafe. Accordingly, it has been determined by the inventors that there is a need to provide an electronic level sensor and an electronic display responsive to the level sensor to display the level, or quantity, of the beverage within the dispenser.

SUMMARY OF THE INVENTION

It is therefore an object of the present invention to provide a beverage dispenser with means for automatically providing a visual indication of level or quantity of beverage within the dispenser on an electronic display.

This objective is achieved in part by provision of a beverage dispenser, with an insulated, opaque body for holding beverage with a closable top for receiving beverage directly from a brewer and a faucet attached to the body for dispensing beverage from within the body, a double-walled tubular sensor located within the body with two conductive paths, a resistance measuring circuit with two inputs respectively connected to the two conductive paths for measuring the resistance between the two inputs; said circuit producing an electrical, direct current, resistance output signal that varies with changes in the instantaneous resistance between the two inputs, an electronic controller connected to the output signal, said controller calculating the depth of any liquid within the dispenser body based on the magnitude of the resistance output signal to produce a display control output signal representative of the depth of any beverage contained within the dispenser body, and an electronic display connected to the controller and responsive to the display control output signal to indicated a depth of any beverage contained within the dispenser body.

Preferably, the dispenser body is made of stainless steel with a cylindrical side wall, a flat bottom and an open top, and including an insulating, plastic cover mounted to the open top and having a cylindrical side wall, an annular cover top and an annular floor, said cover having an interior compartment for protectively mounting a circuit card carrying the resistance measuring circuit and a battery source of power. The annular floor has a central round opening with a horizontal, inwardly extending shoulder for underlying support of an annular collar of an elongate double-walled, cylindrical tube assembly of the double-walled tubular sensor. The cylindrical tube assembly includes an inner cylindrical wall made of stainless steel, an outer wall made of stainless steel, and an insulating annular ring, sandwiched between the inner wall and the outer wall to maintain a gap between the inner wall and the outer wall. An insulating plastic funnel with an annular collar received, within the gap to maintain the gap adjacent a top of the beverage dispenser. The annular ring is made of one of (a) silicon and (b) epoxy. The tubular sensor has an outer wall that carries a plurality of substantially identical, electrically insulating stripes spaced from a top of the tubular sensor to a bottom of the tubular sensor. The tubular sensor has an inner wall and an outer wall separated by a gap and the resistance being measured is the resistance between the inner wall and the outer said resistance being effectively infinite in the absence of contact with beverage. Preferably, the controller includes means for adjusting the calculation of beverage depth depending upon the type of beverage being measured to compensate for differences in resistivity of the different beverages, and the means for automatically determining the type of beverage within the dispenser body and the controller includes means responsive to the automatically determining means for selecting an appropriate resistance to depth conversion table to calculate the depth.

The object of the invention is also obtained in part by provision of a beverage dispenser, with an insulated, opaque body for holding beverage with a closable top for receiving beverage directly from a brewer and a faucet attached to the body for dispensing beverage from within the body, a split tube sensor with two elongate, semi-cylindrical, stainless steel sensor members, said sensor members being aligned and having flat, diametrical sides facing each other across an intermediate gap, a resistance measuring circuit with two inputs respectively connected to the two sensor members for measuring the resistance between the two sensor members, said circuit producing an electrical, direct current, resistance output signal that varies with changes in the instantaneous resistance between the two inputs, an electronic controller connected to the output signal, said controller calculating the depth of any liquid within the dispenser body based on the magnitude of the resistance output signal to produce a display control output signal representative of the depth of any beverage contained within the dispenser body, and an electronic display connected to the controller and responsive to the display control output signal to indicate a depth of any beverage contained within the dispenser body.

Preferably, in one embodiment, the two sensor members are held together in spaced oppositely facing relationship with at least one insulating fastener, and one of the sensor members made of metal and has a metallic surface uncovered for complete exposure to beverage. Another one of sensor members is substantially identical to the one sensor member except that it has an outer metallic surface that is covered with an insulating covering that insulates it from contact with the beverage at a plurality of insulating stripes separated by uncovered strips of the outer metallic surface. The split tube sensor is held in a vertical orientation within the body of the dispenser. In another embodiment the sensor members are substantially identical with both having entire external uncovered and exposed for contact with any beverage within the dispenser.

The objective of the invention is also acquired by providing a beverage dispenser, having a dispenser body with an interior surface coated with a plurality of circular, horizontal stripes of insulating material separated by strips of the interior surface that are not coated but have metal surfaces exposed to beverage, an elongate sensor tube vertically aligned within the dispenser body, a resistance measuring circuit with two inputs respectively connected to the interior surface of the dispenser body and the sensor tube for measuring the resistance between the two inputs, said circuit producing an electrical, direct current, resistance output signal that varies with changes in the instantaneous resistance between the two inputs, an electronic controller connected to the output signal, said controller calculating the depth of any liquid within the dispenser body based on the magnitude of the resistance output signal to produce a display control output signal representative of the depth of any beverage contained within the dispenser body, and an electronic display connected to the controller and responsive to the display control output signal to indicated a depth of any beverage contained within the dispenser body.

BRIEF DESCRIPTION OF THE DRAWINGS

The invention is described below with reference to the several views of the drawing, in which.

DETAILED DESCRIPTION

Figure 1:
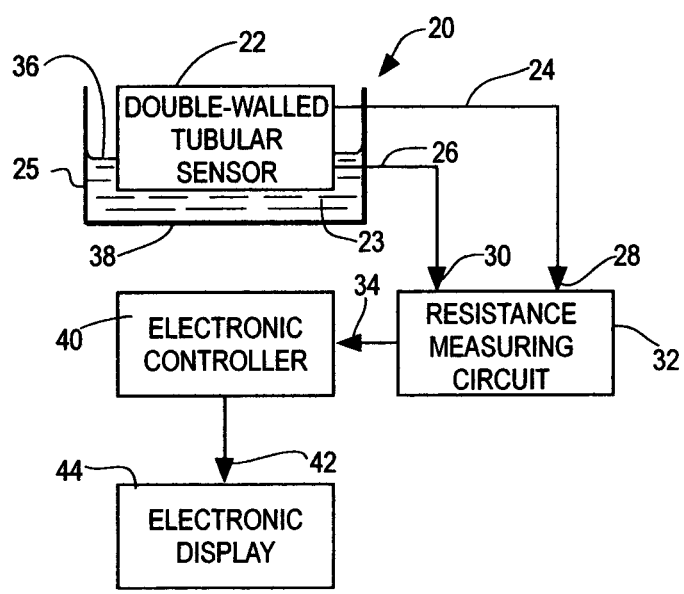
FIG. 1 is a functional block diagram of the liquid volume display assembly of the present invention.

Referring to FIG. 1, one embodiment of the beverage dispenser with level measuring apparatus and display, or beverage dispenser, 20 of the present invention is seen to have a double-walled tubular, preferably cylindrical, sensor 22 that is immersed in liquid 23 within an opaque, stainless steel container, or beverage dispenser 25. The liquid container 25 may be a commercial beverage dispenser used in conjunction with a commercial beverage brewer and the liquid may be freshly brewed coffee or tea. Such a dispenser receives heavy and rough use and must be made of durable materials, with strong structural integrity, such as stainless steel. Because the dispenser is made from such opaque materials as steel, the level of the liquid 23 cannot be discerned by simply viewing the outside of the dispenser. During use of the dispenser, the beverage is first freshly brewed into the dispenser and then the dispenser is moved to a serving location spaced from the brewer and spaced from a source of electrical power. It is desired to know the quantity of beverage remaining in the dispenser during service so that when it may be promptly removed and refilled when it becomes empty and replaced with another filled dispenser.

The double-walled tubular sensor is connected via two conductive paths 24 and 26 to two inputs 28 and 30, respectively, of a resistance measuring circuit 32. The resistance measuring circuit 32 measures the resistance between the two inputs 28 and 30 to produce an electrical, direct current, resistance output signal that varies with changes in the instantaneous resistance between the two inputs 28 and 30. The resistance output signal is connected to an input 34 of an electronic controller 40 that is preferably a microprocessor but may be an ASIC based or other like circuit.

The electronic controller 40 calculates the depth of the liquid 23, i.e. the distance of the level 36 of the liquid 23 above the bottom 38 of the container 25, based on the magnitude of the resistance output signal applied to input 34. The sensed and calculated level is then converted to suitable display control output signals produced on a controller output terminal and connected to an input 42 of an electronic display 44. The electronic display 44 responds to the display control signals at its input 42 to provide a visual indication of the level or quantity of beverage within the container. The visual indication may be graphic or numeric.

The beverage dispenser 25 and the electronic display 44 may be like the dispenser and associated display shown and described in U.S. Pat. No. 6,741,180 issued May 25, 2004 and entitled "Beverage Dispensing Urn with Electronic Display', which is hereby incorporated by reference. Alternatively, the beverage dispenser may be an airpot dispenser and the display may be like that shown in U.S. application Ser. No. 10/990, 283 filed Nov. 30, 2004, and entitled. Air Pot Beverage Dispenser with Flow Through Lid and Display and Method", which is hereby incorporated by reference.

Figure 2:
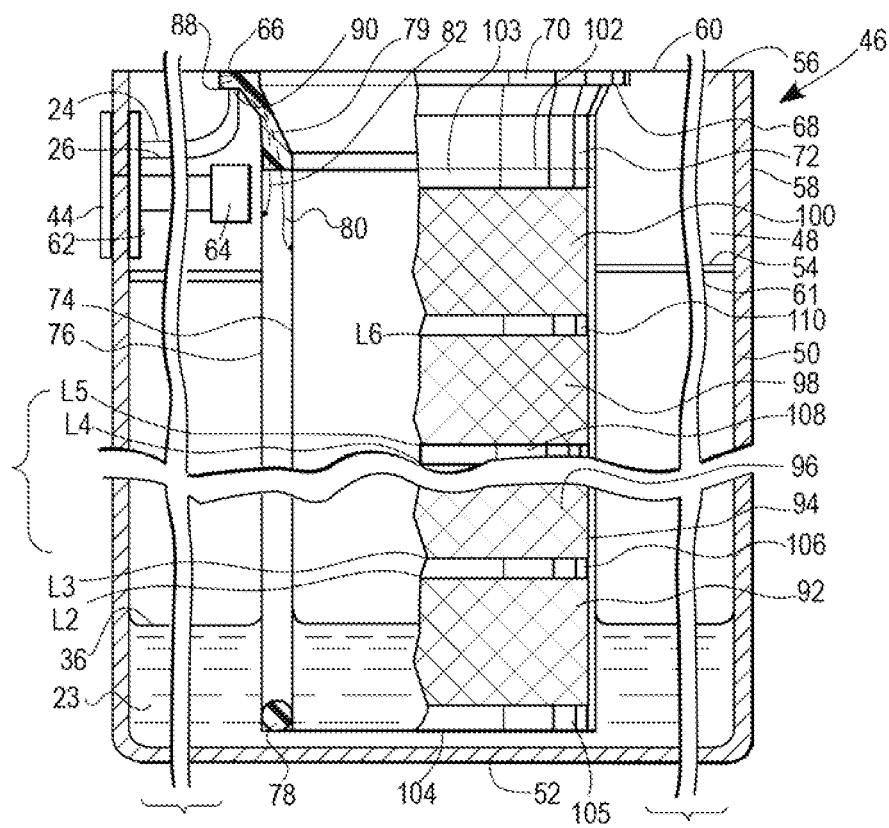
FIG. 2 is a schematic side-view illustration, partially in section illustrating one form of the volume display assembly of FIG. 1 in which an outer surface of an outer tube of a double-walled sensor tube is surrounded with insulating stripes spaced along its length.
Figure 3:
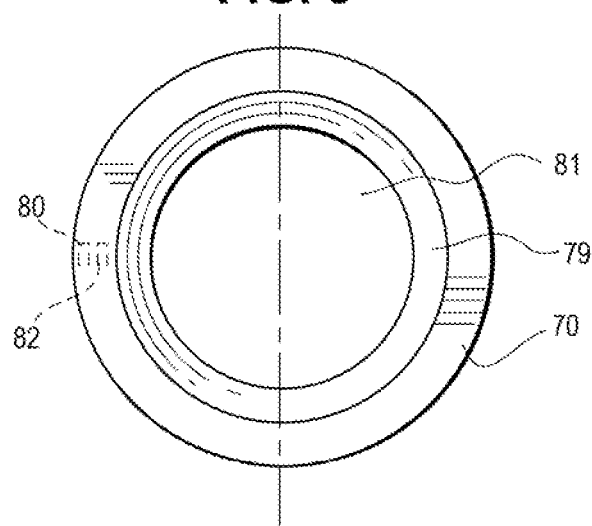
FIG. 3 is a top view of the double-walled sensor tube of the volume display assembly of FIG. 2.

Referring to FIG. 2, a schematic illustration of a beverage dispenser 46 that embodies the features described above with reference to FIG. 1 is seen to include a stainless steel dispenser body 48 with a cylindrical side wall 50, a flat bottom 52 and an open top 54. Mounted to the open top 54 is an insulating, plastic cover 56 having a cylindrical side wall 58 and an annular cover top 60 and an annular floor 61. Mounted to the cylindrical side wall 50 is the display 44 visible from outside of the wall 50 which is connected to a circuit card 62 carrying the resistance measuring circuit 32 and the electronic controller 34. The circuit card is protectively contained within the interior of the cover 56. Battery power source 64 is also contained within the cover 56 and is connected to the circuit card 62 to provide it with power.

Referring, also to FIG. 2, the annular floor 61 has a central round opening 66 with a horizontal, inwardly extending shoulder 68 for underlying support of an annular collar 70 of an elongate double-walled, cylindrical tube assembly 72 of the double-walled tubular sensor 22. FIG. 1. The assembly 72 includes has an inner cylindrical wall 74 made of stainless steel and an outer wall 76 of stainless steel. At the bottom, a gap between the inner tubular wall, or inner tube, 74 and the outer tubular wall, or outer tube, 76 is maintained by means of an insulating annular ring 78 made of silicon or epoxy. At the top, the gap is maintained by an insulating plastic funnel 79 of which the annular collar 70 is a part. Preferably, the funnel is made of polypropylene. When the funnel is not receiving beverage from the brewer, a closure (not shown) is provided to close the funnel opening 81. The walls 74 and 76 have a thickness of approximately 0.010 inch. The outer diameter of the outer wall 76 is approximately 0.625-inch and diameter of the inner wall is approximately 0.50 inch.

An electrical conductive path is provided between the inner wall 74 and sensor output lead 24 as represented by a lead 80. Another conductive path extends from the outer wall 76 and the sensor output lead 26 as represented by lead 82. These conductive paths may be created in multiple ways.

For example, actual leads such as leads 80 and 82 may be protectively embedded within the plastic of the funnel 79 and terminate at contacts exposed at the underside of the collar 68. A mating pair of connection terminals 88 and 90 is exposed at the upwardly facing plastic surface of the shoulder 68 that are connected to output leads 24 and 26, respectively. When the tube assembly 72 is releasably mounted within the opening 66, with the underside of the collar 70 resting upon the shoulder 68, a pair of contacts comes into releasable electrical contact with a pair of the mating connection terminals 88 and 90, respectively. If the contacts and connection terminals are not formed in the shape of annular rings that circumnavigate the shoulder and the collar, then a key is used to insure that the contacts and connection terminals are correctly aligned with each other when the tube assembly is fully seated within opening 66.

As seen, the tube assembly extends from adjacent the bottom 52 to the top 60 and the outer wall 76 carries a plurality of substantially identical, electrically insulating, stripes 92, 94, 96, 98 and 100 that are painted onto, otherwise adhered to or formed into the outer surface of the outer wall 76. Preferably, the non-conductive stripes are made of polypropylene. The stripes 92 and 100 are spaced from the top 102 and the bottom 104 of the tube 76 respectively to provide strips 103 and 105 of electrically conductive stainless steel exposed for direct contact with the beverage 23. Strips 106, 108 and 110 of exposed electrically conductive stainless steel are also provide between adjacent insulated stripes 92 and 94, between 96 and 98 and between 98 and 100. Strips of exposed electrical conductive stainless steel are also provided between all adjacent insulating stripes, including any that are not shown. The conductive stainless steel underlying the insulating material of the electrically insulating stripes is protectively insulated, from contact with the beverage 23. The width of the conductive strips is approximately 0.125-inch wide and the non-conductive stripes are approximately one inch wide. The length of the tube assembly 72 depends on the depth of the dispenser body and is selected so that the bottom extends to a location adjacent the bottom of the dispenser body.

Figure 4:
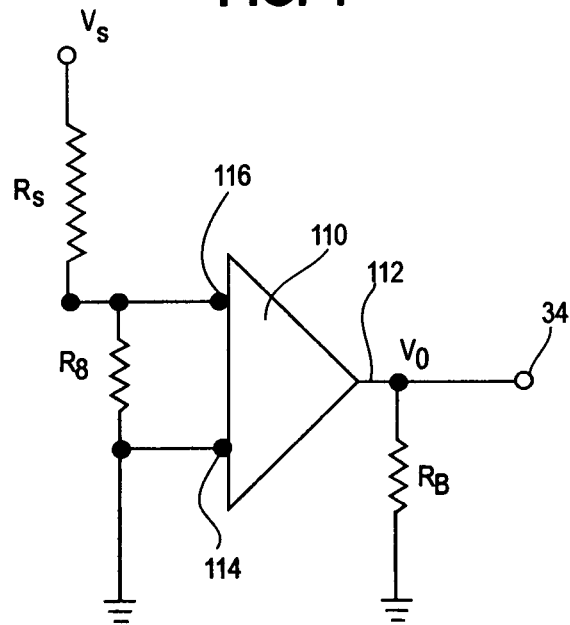
FIG. 4 is a circuit schematic of one form of the resistance measuring circuit functional block of FIG. 1.
Figure 5:
FIG. 5 is a schematic illustration of the general type of stepped output voltage of the resistance measuring circuit of FIGS. 1 and 4.

Referring now to FIGS. 4 and 5, the resistance measuring circuit has an amplifier 110 with an output 112 connected to the input 34 of the electronic controller 40. A reference input 114 is connected to ground, and a signal input 116 is connected to a junction between an input bias resistor Rbi and the resistance Rs being sensed between the double walled sensor outputs 24 and 26. This resistance Rs is the resistance being measured between the inner wall 74 and the outer wall 76. In the absence of contact with the beverage, coffee or tea, for instance, the sensed resistance Rs is effectively infinite and the output signal Vo appearing an output 112 is effectively zero.

Referring now to FIG. 5, when the level 36 of the liquid 23 contacts the bottom conductive strip 105 and then begins to rise, the resistance Rs begins to linearly decrease at a first relatively rapid rate of decline which causes the output signal Vo to linearly increase at a relatively rapid rate of incline as shown by the portion of the waveform between zero and L1. Once the beverage level 36 reaches the bottom of the first nonconductive stripe 92 the resistance Rs becomes the sum of the resistance established through the beverage and the first conductive stripe 105 plus whatever slight decrease of resistance occurs due to increased contact of the beverage with the completely exposed inner wall 76. Accordingly, the output signal Vo has a stair case waveform as shown in FIG. 5.

The inventors have determined that different beverages have significantly different characteristic resistivities. Accordingly, depending upon which beverage is being measured, the magnitude of the output Vo for a given level may vary. Accordingly, conversion by the controller of the magnitude of Vo to a particular beverage level must be adjusted for the particular beverage being measured, such as tea, coffee, etc.

In accordance with the invention, a different conversion table is empirically determined and then stored in the controller 34 for each of the different types of beverage being measured. Each conversion table relates each of the incremental indications of quantity that are to be displayed to a minimum magnitude of the output signal Vo. While switching from one conversion table to another may be performed manually by an operator, such as by means of a selector switch, in keeping with one aspect of the invention, the particular beverage that is being, received into the dispenser 46 is automatically determined and the appropriate conversion table automatically selected.

Figure 6:
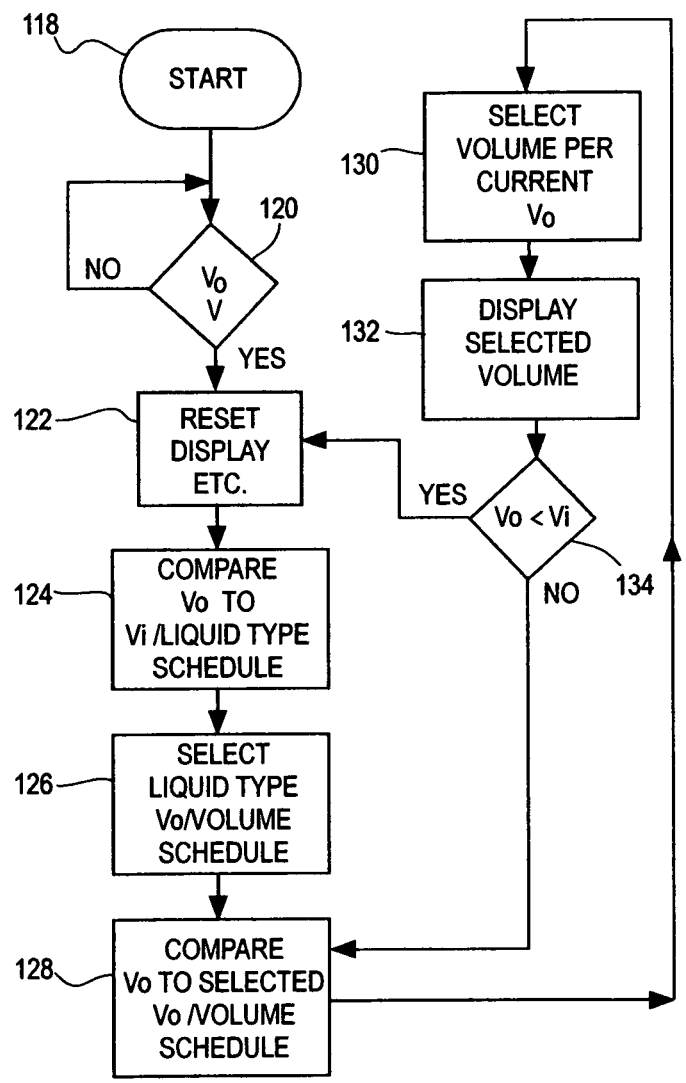
FIG. 6 is a flow chart of the operation of the operation of the microprocessor controller of FIG. 1.

The controller software is caused to operate in accordance with the logic flow chart of FIG. 6 to determine the type of beverage as soon as the dispenser begins to receive the beverage at the bottom 52 of the dispenser 46. After the start 118, in step 120 a determination is made as to whether the magnitude of the output signal Vo is equal to zero volts. A very low magnitude of Vo of course indicates that there is a very high resistance is because the dispenser is empty or near empty and the level is 36 is beneath the bottom 104 of the tube assembly 72 and thus is not in contact with any of the conductive strips. When it is determined that the magnitude of Vo is approximately equal to zero volts, in step 122, the display is reset to show that the dispenser is empty, and the controller is generally reset to begin a new measurement cycle. Next, in step 124, when the beverage is first being added to the dispenser 72 and first reaches level L1, the magnitude of the initial magnitude Vi of the output signal Vo is determined and compared to a Vi versus liquid type schedule. For instance, if the initial voltage Vi equals a preselected voltage magnitude V1 associated with coffee, then it is known that the beverage is coffee. However, if the initial voltage Vi is equal to a preselected voltage magnitude V2 associated with tea, then is known that the beverage is tea and not coffee. In step 126, the Vo versus level or beverage quantity schedule associated with the type of beverage determined in step 124 is selected for use in converting different magnitudes of Vo to indications of level.

Thereafter, in steps 128, 130 132 the schedule for the selected beverage is used to determine the beverage quantity and to control the display 44 accordingly. In step 128 the output voltage Vo is compared the selected voltages of the voltage magnitude versus level or volume schedule of the associated beverage. Next, in step 130 the particular volume for a given current or instantaneous value of Vo is selected for display, and in step 132 the particular volume is displayed on the display 44. Then, in step 134, a determination is made as to whether the output voltage Vo has again been reduced to a level less that the lowest initial voltage Vi. If so, then the program moves to step 122 to reset the display, and the measurement system is readied for another cycle of operation. If not, then the program cycles back to step 128 and measurements continue to be made corresponding levels continue to be displayed.

Figure 7:
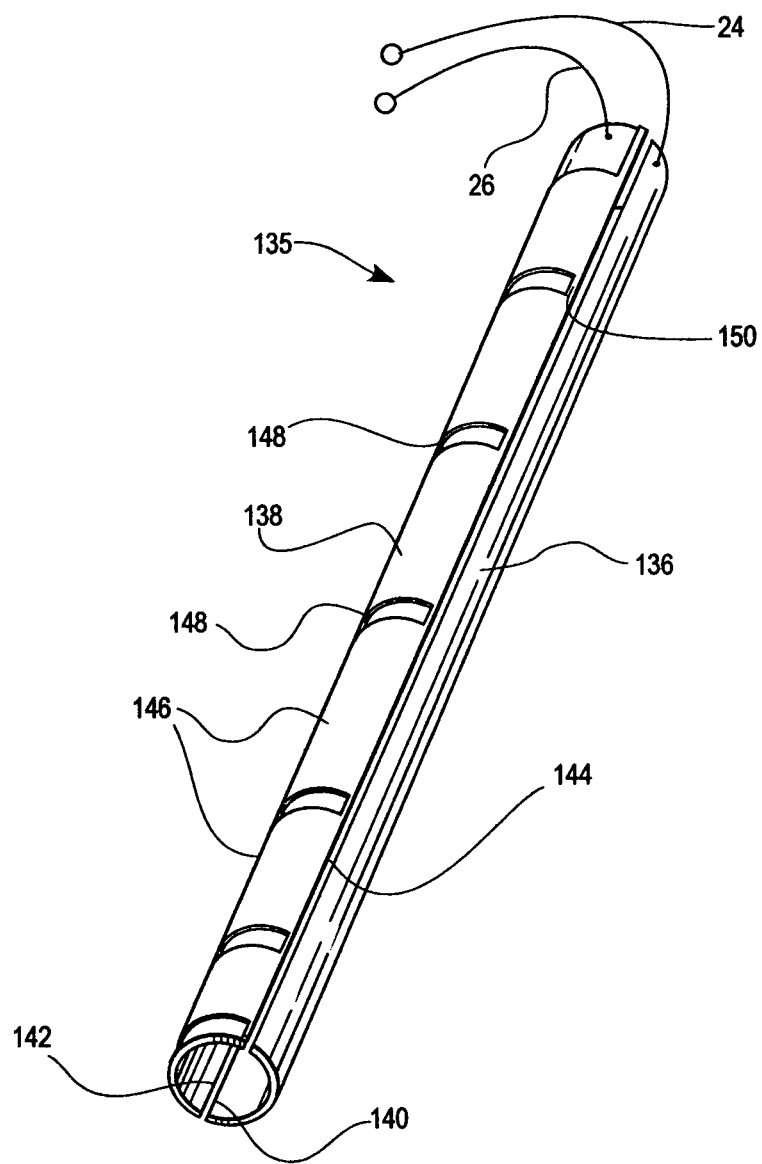
FIG. 7 is a perspective view of another form of the double-walled sensor tube similar to that schematically shown in FIG. 3.

Referring now to FIG. 7, another embodiment of a sensor, a split tube sensor 135 is shown in which the functions of the inner tube 74 and the outer tube 76 of FIG. 2 are performed by two elongate, semi-cylindrical, stainless steel sensor members 136 and 138, respectively. The length of the members is approximately eight to twelve inches. They are aligned with their respective flat, diametrical sides 140 and 142 facing each other and separated by a relatively narrow gap 144. The two sensor members 136 and 138 are held together in the relationship shown by suitable insulating fasteners or the like. The sensor member 136 is made of uncovered metal, preferably stainless steel, with the entire external metallic surface uncovered for complete exposure to beverage. The other sensor member 138 is substantially identical to the sensor member 136, except that the outer surface is covered with an insulating covering, such as an insulating paint, that covers the metallic surface and insulates it from contact with the beverage at a plurality of insulating stripes 146 separated by uncovered conductive strips 148. The conductive strips 148 at opposite ends are separated from the elongate edges where the cylindrical surface meets the elongate edge 142 by a small gap 150 (only one side shown). Lead 24 is connected to sensor member 136 and lead 26 is connected to lead 138. The split tube sensor 135 is held vertically within the container 25, is substituted for the sensor assembly of FIG. 2 and generally functions substantially the same way as the sensor assembly of FIG. 2 as described above with reference to FIGS. 2-6.

Figure 9:
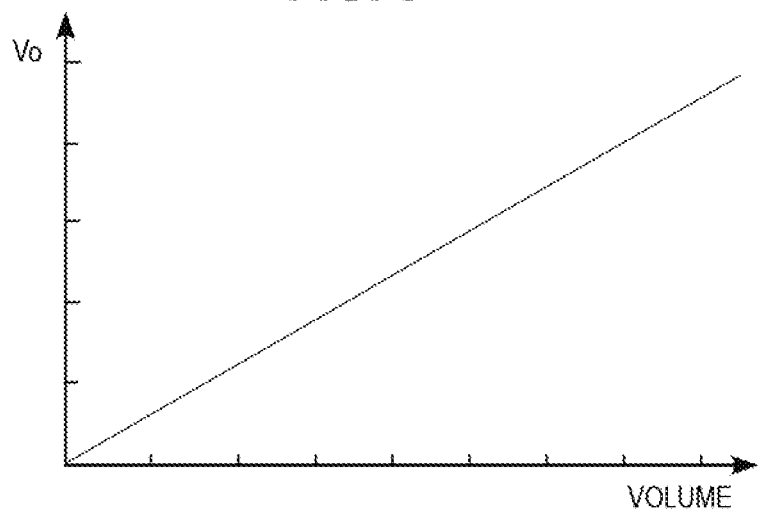
FIG. 9 is a is a schematic illustration of the general type of continuous output voltage of the resistance measuring circuit of FIGS. 1 and 4 when used with the liquid volume display assembly of FIG. 8.

Alternatively, neither of the sensor members 136 and 138 of the split tube sensor 135 of FIG. 7 are provided with non-conductive, insulating stripes. In such case, the output signal Vo does not have a step function but is straight line linear as shown by the waveform of FIG. 9. Also, the sensor members 136 and 138 are preferably thin-walled semi-cylinders that are mounted to the outside of a hollow cylindrical core made of insulating material, such as polypropylene. Alternatively, elongate insulating fasteners located may be used to fasten together the elongate edges of the sensor members 136 and 138. In such case the split tube sensor 135 may be used as a down spout for the dispenser, as shown in FIG. 1.

Figure 8:
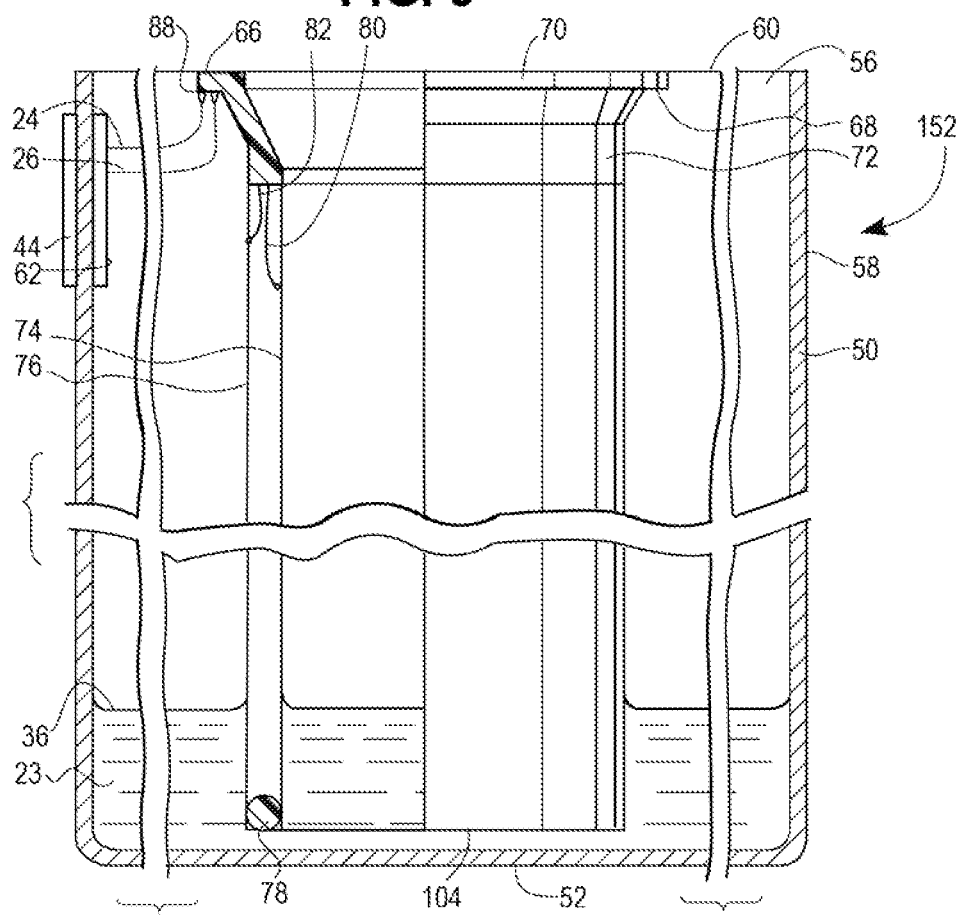
FIG. 8 is schematic side-view illustration of another form of the double-walled sensor similar to that of FIG. 2 but in which the outside of the outer tube has not been partially covered with insulating stripes.

Referring now to FIGS. 8 and 9, another sensor assembly 152 is shown that is substantially identical to that of FIGS. 1-6, except that the insulating stripes are removed. All other features of the sensor assembly 152 that have been given the same reference numbers as in the sensor assembly of FIG. 2 are the same as those in FIG. 2 and function the same, as described above. As seen in FIG. 9, the level versus curve of the output signal Vo is substantially continuously linear without any step like function. Because of the lack of the steps, a microprocessor that may be more discerning and more expensive than that required with a stepped function output signal. Otherwise, the different levels correspond to different levels of resistance between the inner tube 74 and the outer tube 76 that are measured and converted to representations of level or quantity of beverage.

Figure 10:
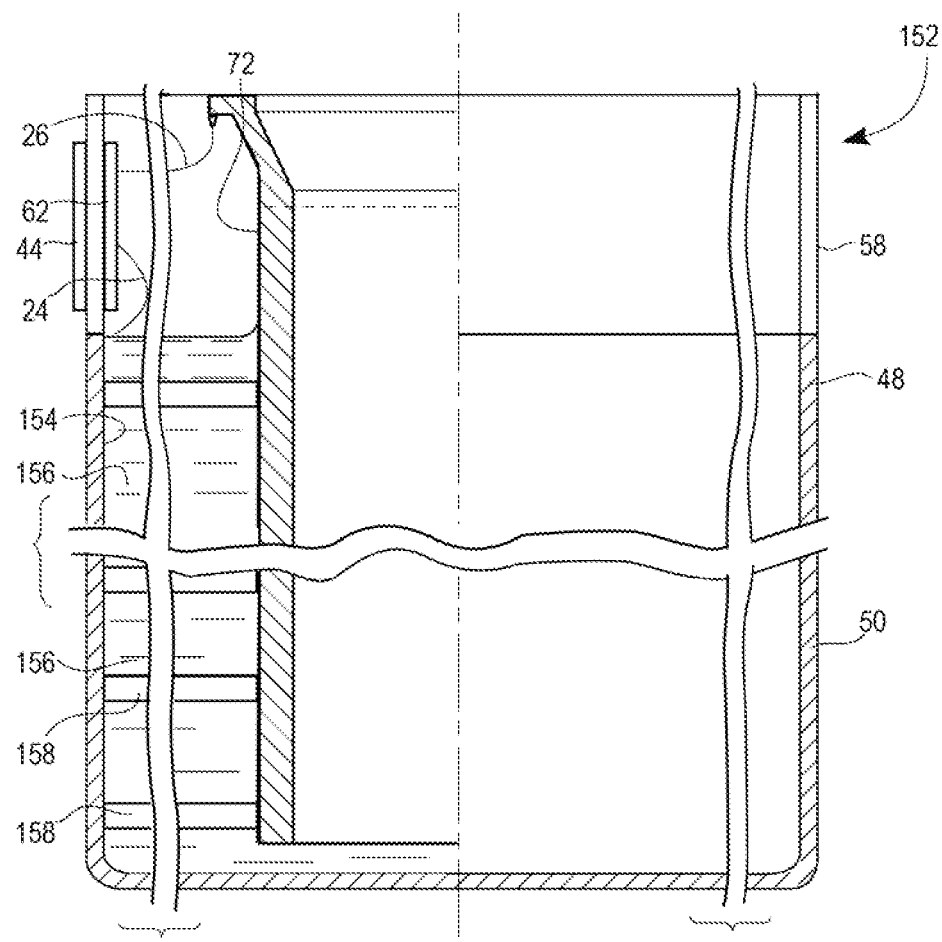
FIG. 10 is a schematic side-view illustration, partially in section, illustrating another form of the volume display of FIG. 1 in which the double-walled sensor tube is defined by a single-walled sensor tube and a surrounding surface of a metal container of the liquid being measured.

Referring to FIG. 10, another embodiment of the present invention is shown in FIG. 10 in which a metal dispenser 152 is provided that is substantially like the dispenser of FIG. 8 except the inside surface 154 of the side wall 50 of the dispenser body is coated with a plurality of circular, horizontal, relatively wide stripes 156 of insulating material which create a corresponding plurality of alternating strips 158 of conductive metal exposed to the beverage 23. Another difference is that the tube assembly has no stripes of insulating material and performs the same function as the inner tube 74 of the embodiment of FIG. 1. On the other hand, the striped interior surface of the side wall 50 corresponds to and performs the same function as the striped outer wall 76 of the embodiment of FIG. 1. Lead 26 is connected to the exterior surface of the tube assembly 72 through mating contacts at shoulder 68 and collar 66, and lead 24 is connected directly to the wall 50. This arrangement results in creation of an output signal Vo that is substantially the same step function developed in the first embodiment described above with reference to FIGS. 1-6.

While particular embodiments have been illustrated in detail, it should be appreciated that many variations may be made thereto without departing from the spirit of the invention. For instance, while the embodiments have been described as creating non-conductive stripes by adhering them to a piece of underlying metal, it should be appreciated that the alternating non-conductive stripes and conductive strips can also be created by adhering metal to an underlying piece of underlying non-conductive material. Also, the plastic can be molded around metal strips that are imbedded within the plastic but exposed at the surface of the plastic substrate. While both of the sensors must be in contact with the beverage they do not have to be physically attached to each other or be in close proximity to each other. Basically, all the invention requires are two sensors that are electrically isolated from each other except through contact with the same beverage, means for measuring the resistance between the two sensors and means for converting the sensed resistance to a representation of depth, level or quantity.

The invention claimed is:

1. A beverage dispenser, comprising:
   an insulated, opaque dispenser body for holding a beverage, with a closable top for receiving beverage directly from a brewer and a faucet attached to the body for dispensing the beverage from within the body, said dispenser body being made of stainless steel with a cylindrical side wall, a bottom and an open top;
   a double-walled tubular sensor located within the body with two conductive paths,
      said sensor having an outer wall and an inner wall separated and maintained in spaced relationship by an electrical insulator,
      one of said walls having a surface with plurality of substantially identical, electrically insulating stripes alternating with a plurality of non-conductive strips defining one of the conductive paths,
      another one of the walls having a continuous conductive surface defining another one of the conductive paths, and
   both of said surfaces being exposable to direct contact with the beverage when within the dispenser body;

a resistance measuring circuit with two inputs respectively connected to the two conductive paths for measuring an instantaneous resistance between the two inputs, said circuit producing an electrical, direct current, resistance output signal with a magnitude that varies with changes in the instantaneous resistance between the two inputs;

an electronic controller connected to the output signal, said controller calculating a depth of any of the beverage within the dispenser body based on the magnitude of the resistance output signal, to produce a display control output signal representative of the depth of the beverage contained within the dispenser body;

an electronic display connected to the controller and responsive to the display control output signal to indicate a depth of any of the beverage contained within the dispenser body; and an insulating, plastic cover mounted to the open top and having a cylindrical side wall, an annular cover top and an annular floor, said cover having an interior compartment for protectively mounting, a circuit card carrying the resistance measuring circuit and a battery source of power.

2. The beverage dispenser of claim 1 in which the dispenser annular floor has a central round opening with a horizontal, inwardly extending shoulder for underlying support of an annular collar of an elongate double-walled, cylindrical tube assembly of the double-walled tubular sensor.

3. A beverage dispenser, comprising:
an insulated, opaque dispenser body for holding a beverage, with a closable top for receiving the beverage directly from a brewer and a faucet attached to the body for dispensing the beverage from within the body, said dispenser body being made of stainless steel with a cylindrical side wall, a flat bottom and an open top;

a double-walled tubular sensor located within the body with two conductive paths, the double-walled tubular sensor including
an inner cylindrical wall made of stainless steel,
an outer wall made of stainless steel, and
an insulating annular ring sandwiched between the inner wall and the outer wall to maintain a gap between the inner wall and the outer wall;

a resistance measuring circuit with two inputs respectively connected to the two conductive paths for measuring an instantaneous resistance between the two inputs, said circuit producing an electrical, direct current, resistance output signal with a magnitude that varies with changes in the instantaneous resistance between the two inputs;

an electronic controller connected to the output signal, said controller calculating a depth of any of the beverage within the dispenser body based on the magnitude of the resistance output signal, to produce a display control output signal representative of the depth of the beverage contained within the dispenser body;

an electronic display connected to the controller and responsive to the display control output signal to indicate a depth of any of the beverage contained within the dispenser body; and an insulating, plastic cover mounted to the open top and having a cylindrical side wall, an annular cover top and an annular floor, said cover having an interior compartment for protectively mounting a circuit card carrying the resistance measuring circuit and a battery source of power and the annular floor has a central round opening with a horizontal, inwardly extending shoulder for underlying support of an annular collar of an elongate double-walled, cylindrical tube assembly of the double-walled tubular sensor.

4. The beverage dispenser of claim 3 including an insulating plastic funnel with an annular collar received within the gap to maintain the gap adjacent a top of the beverage dispenser.

5. The beverage dispenser of claim 3 in which the annular ring is made of (a) silicon or (b) epoxy.

6. A beverage dispenser, comprising:
an insulated, opaque dispenser body for holding a beverage with a closable top for receiving the beverage directly from a brewer and a faucet attached to the body for dispensing, beverage from within the body;

a double-walled tubular sensor located within the body with two conductive paths, said tubular sensor having an outer wall that carries a plurality of substantially identical, electrically insulating stripes spaced from a top of the tubular sensor to a bottom of the tubular sensor;

a resistance measuring circuit with two inputs respectively connected to the two conductive paths for measuring an instantaneous resistance between the two inputs, said circuit producing an electrical, direct current, resistance output signal that with a magnitude that varies with changes in the instantaneous resistance between the two inputs;

an electronic controller connected to the output signal, said controller calculating a depth of any of the beverage within the dispenser body based on the magnitude of the resistance output signal to produce a display control output signal representative of the depth of any beverage contained within the dispenser body; and an electronic display connected to the controller and responsive to the display control output signal to indicate the depth of any of the beverage contained within the dispenser body.

7. A beverage dispenser, comprising:
an insulated, opaque dispenser body for holding a beverage, with a closable top for receiving the beverage directly from a brewer and a faucet attached to the body for dispensing the beverage from within the body;

a double-walled tubular sensor located within the body with two conductive paths, said tubular sensor having an inner wall and an outer wall separated by a gap and having a resistance between the inner wall and the outer wall, said resistance being effectively infinite in the absence of contact with beverage;

a resistance measuring circuit with two inputs respectively connected to the two conductive paths for measuring the resistance between the two inputs, said circuit producing an electrical, direct current, resistance output signal with a magnitude that varies with changes in the resistance between the two inputs;

an electronic controller connected to the output signal, said controller calculating a depth of any of the beverage within the dispenser body based on the magnitude of the resistance output signal to produce a display control output signal representative of the depth of the beverage contained within the dispenser body; and an electronic display connected to the controller and responsive to the display control output signal to indicate the depth of any of the beverage contained within the dispenser body.

8. A beverage dispenser, comprising:
an insulated, opaque dispenser body for holding a beverage, with a closable top for receiving the beverage directly from a brewer and a faucet attached to the body for dispensing beverage from within the body;

a double-walled tubular sensor located within the body with two conductive paths;

a resistance measuring circuit with two inputs respectively connected to the two conductive paths for measuring a resistance between the two inputs, said circuit producing an electrical, direct current, resistance output signal with a magnitude that varies with changes in the resistance between the two inputs;

an electronic controller connected to the output signal, said controller performing a calculation of a depth of any of the beverage within the dispenser body based on the magnitude of the resistance output signal to produce a display control output signal representative of the depth, said controller including means for adjusting the calculation of beverage depth depending upon a type of the beverage being measured to compensate for differences in resistivity of different beverages; and an electronic display connected to the controller and responsive to the display control output signal to indicate the depth of any of the beverage contained within the dispenser body.

9. A beverage dispenser, comprising:

an insulated, opaque dispenser body for holding a beverage, with a closable top for receiving a beverage directly from a brewer and a faucet attached to the body for dispensing the beverage from within the body;

a double-walled tubular sensor located within the body with two conductive paths;

a resistance measuring circuit with two inputs respectively connected to the two conductive paths for measuring a resistance between the two inputs, said circuit producing an electrical, direct current, resistance output signal with a magnitude that varies with changes in the resistance between the two inputs;

an electronic controller connected to the output signal, said controller performing a calculation of a depth of any of the beverage within the dispenser body based on the magnitude of the resistance output signal to produce a display control output signal representative of the depth, said controller including means for adjusting the calculation of the beverage depth depending upon a type of the beverage being measured to compensate for differences in resistivity of different beverages; and an electronic display connected to the controller and responsive to the display control output signal to indicate the depth of any of the beverage contained within the dispenser body;

means for automatically determining the type of beverage within the dispenser body, and in which the controller includes means responsive to the means for automatically determining the type of beverage for selecting an appropriate resistance to depth conversion table to calculate the depth.

10. A beverage dispenser, comprising:

an insulated, opaque body for holding a beverage, with a closable top for receiving the beverage directly from a brewer and a faucet attached to the body for dispensing beverage from within the body;

a split tube sensor with two elongate, semi-cylindrical, stainless steel sensor members, said sensor members being aligned and having flat, sides facing each other across an intermediate gap;

a resistance measuring circuit with two inputs respectively connected to the two sensor members for measuring and instantaneous resistance between the two sensor members, said circuit producing an electrical, direct current, resistance output signal with a magnitude that varies with changes in the instantaneous resistance between the two inputs;

an electronic controller connected to the output signal, said controller calculating a depth of any beverage within the dispenser body based on the magnitude of the resistance output signal to produce a display control output signal representative of the depth of any of the beverage contained within the dispenser body; and an electronic display connected to the controller and responsive to the display control output signal to indicate the depth of any of the beverage contained within the dispenser body.

11. The beverage dispenser of claim 10 in which the two sensor members are held together in a spaced oppositely facing relationship with at least one insulating fastener, and one of the sensor members is made of metal and has a metallic surface uncovered for complete exposure to beverage.

12. The beverage dispenser of claim 10 in which the sensor members are substantially identical, with both sensor members having exposed external surfaces entirely uncovered and exposed for contact with any beverage within the dispenser.

13. A beverage dispenser, comprising:

an insulated, opaque body for holding a beverage, with a closable top for receiving the beverage directly from a brewer and a faucet attached to the body for dispensing beverage from within the body;

a split tube sensor with two elongate, semi-cylindrical, stainless steel sensor members, said sensor members being aligned and having flat, diametrical sides facing each other across an intermediate gap, one of the sensor members being substantially identical to another one of the sensor members except for having an outer metallic surface that is covered with an insulating covering that insulates the one sensor member from contact with the beverage at a plurality of electrically insulating stripes separated by uncovered strips of the outer metallic surface, the two sensor members being, held together in a spaced oppositely facing relationship with at least one insulating fastener, and one of the sensor members being made of metal and having a metallic surface uncovered for complete exposure to beverage;

a resistance measuring circuit with two inputs respectively connected to the two sensor members for measuring an instantaneous resistance between the two sensor members, said circuit producing an electrical, direct current, resistance output signal with a magnitude that varies with changes in the instantaneous resistance between the two inputs;

an electronic controller connected to the output signal, said controller calculating a depth of any liquid beverage within the dispenser body based on the magnitude of the resistance output signal to produce a display control output signal representative of the depth of any of the beverage contained within the dispenser body; and an electronic display connected to the controller and responsive to the display control output signal to indicate a depth of any of the beverage contained within the dispenser body.

14. The beverage dispenser of claim 13 in which the split tube sensor is held in a vertical orientation within the body of the dispenser.

15. A beverage dispenser, comprising:
- a dispenser body for holding a beverage with an interior surface coated with a plurality of circular, horizontal stripes of electrically insulating material separated by strips of the interior surface that are not coated but have metal surfaces exposable to beverage;
- an elongate sensor tube vertically aligned within the dispenser body;
- a resistance measuring circuit with two inputs respectively connected to the interior surface of the dispenser body and the sensor tube for measuring and instantaneous resistance between the two inputs, said circuit producing an electrical, direct current, resistance output signal with a magnitude that varies with changes in the instantaneous resistance between the two inputs;
- an electronic controller connected to the output signal, said controller calculating a depth of any of the beverage within the dispenser body based on the magnitude of the resistance output signal to produce a display control output signal representative of the depth of any of the beverage contained within the dispenser body; and
- an electronic display connected to the controller and responsive to the display control output signal to indicate the depth of any of the beverage contained within the dispenser body.

* * * * *